(12) United States Patent
West et al.

(10) Patent No.: US 7,819,251 B2
(45) Date of Patent: Oct. 26, 2010

(54) PAPER TUBE PACKAGING WITH OPEN END AND COATED CAP

(76) Inventors: Ellery West, 629 Bertsch Ave., Crescent City, CA (US) 95531; Gail West, 629 Bertsch Ave., Crescent City, CA (US) 95531

( * ) Notice: Subject to any disclaimer, the term of this patent is extended or adjusted under 35 U.S.C. 154(b) by 0 days.

(21) Appl. No.: 12/435,852

(22) Filed: May 5, 2009

(65) Prior Publication Data

US 2010/0150972 A1 Jun. 17, 2010

Related U.S. Application Data

(60) Provisional application No. 61/193,689, filed on Dec. 16, 2008.

(51) Int. Cl.
*B65D 85/00* (2006.01)
(52) U.S. Cl. .................. 206/581; 206/484.2; 206/524.3; 206/524.6
(58) Field of Classification Search .................. 206/581, 206/210, 823, 447, 385, 813, 277, 484, 484.2, 206/524.1, 524.2, 524.3, 524.9, 524.6
See application file for complete search history.

(56) References Cited

U.S. PATENT DOCUMENTS

| | | | |
|---|---|---|---|
| 2,880,913 A | | 4/1959 | Peyron |
| 3,558,036 A | * | 1/1971 | DeVoe ................. 229/125.19 |
| 4,398,650 A | * | 8/1983 | Holmes et al. ............. 229/109 |
| 4,780,017 A | | 10/1988 | Bradford |
| 4,839,291 A | * | 6/1989 | Welsh et al. ............. 435/287.4 |
| 4,842,906 A | * | 6/1989 | Ekdahl et al. ............. 428/34.2 |
| 4,976,374 A | * | 12/1990 | Macaluso ............. 229/122.26 |
| 4,978,021 A | * | 12/1990 | Mini et al. ...................... 220/8 |
| 5,133,290 A | * | 7/1992 | De Marco et al. ........... 119/497 |
| 5,205,473 A | * | 4/1993 | Coffin, Sr. .................. 229/403 |
| 5,217,164 A | | 6/1993 | Sullivan |
| 5,356,005 A | * | 10/1994 | Burrello .................. 206/362.4 |
| 5,377,826 A | * | 1/1995 | Ayres et al. ................. 206/246 |
| 5,385,255 A | * | 1/1995 | Varano et al. .............. 229/404 |
| 5,393,566 A | * | 2/1995 | Propst ........................ 427/348 |
| 5,429,294 A | * | 7/1995 | Propst ....................... 229/5.83 |
| 5,480,044 A | | 1/1996 | Nosser |
| 5,531,863 A | * | 7/1996 | Propst ........................... 162/5 |
| 5,543,186 A | * | 8/1996 | Andersen et al. ........... 428/34.4 |
| 5,554,197 A | * | 9/1996 | Assini et al. .................. 8/406 |

(Continued)

FOREIGN PATENT DOCUMENTS

DE 3937168 5/1991

(Continued)

*Primary Examiner*—Jacob K Ackun, Jr.
(74) *Attorney, Agent, or Firm*—Fish & Associates, PC (57) ABSTRACT

A biodegradable tube comprises a mom-rigid paper tubular body defining a lumen for containing a semi-solid composition; a paper tubular cap that slidably mates with the body; and wherein interior surfaces of the each of the body and the cap have a coating that is substantially impermeable to the semi-solid composition. In preferred embodiments the tube body and cap have tapered sealed ends, the coating comprises an adhesive, and the walls of the tube/cap comprise a rolled paper material upon which the coating has been applied. Contemplated semi-solid product materials include for example lip balm, facial cream, lotion, deodorant, sunscreen, caulk, grease sticks, mosquito repellant, and shoe polish.

20 Claims, 9 Drawing Sheets

U.S. PATENT DOCUMENTS

| | | | |
|---|---|---|---|
| 5,598,929 A * | 2/1997 | Jensen et al. | 206/527 |
| 5,676,990 A * | 10/1997 | Wawrzynski | 426/305 |
| 5,738,921 A * | 4/1998 | Andersen et al. | 428/36.4 |
| 5,803,346 A * | 9/1998 | Baker et al. | 229/117.3 |
| 5,839,653 A * | 11/1998 | Zadravetz | 229/403 |
| 5,964,400 A * | 10/1999 | Varano et al. | 229/403 |
| 5,979,650 A * | 11/1999 | Dull | 206/447 |
| 6,006,984 A * | 12/1999 | Chung et al. | 229/137 |
| 6,116,422 A * | 9/2000 | Rabe et al. | 206/459.5 |
| 6,287,247 B1 * | 9/2001 | Dees et al. | 493/58 |
| 6,460,694 B1 * | 10/2002 | Khanna et al. | 206/3 |
| 6,521,581 B1 * | 2/2003 | Hsu et al. | 510/297 |
| 6,637,964 B1 * | 10/2003 | Kuo | 401/55 |
| 6,706,349 B2 * | 3/2004 | Eida et al. | 428/36.6 |
| 7,048,975 B1 | 5/2006 | Tojo et al. | |
| 7,344,784 B2 | 3/2008 | Hodson | |
| 7,435,483 B2 * | 10/2008 | Lee et al. | 428/481 |
| 2004/0245138 A1 * | 12/2004 | Penttinen et al. | 206/484.1 |
| 2005/0023184 A1 * | 2/2005 | Ramet | 206/581 |
| 2005/0121465 A1 | 6/2005 | Miranda | |
| 2006/0278667 A1 | 12/2006 | Weyts | |
| 2007/0131713 A1 | 6/2007 | Hill | |
| 2007/0243008 A1 * | 10/2007 | Vogt | 401/132 |
| 2007/0262129 A1 * | 11/2007 | Zadravetz | 229/403 |
| 2007/0267439 A1 | 11/2007 | Farzan | |
| 2008/0047966 A1 * | 2/2008 | Carson | 220/713 |
| 2009/0304958 A1 | 12/2009 | McNulty | |

FOREIGN PATENT DOCUMENTS

| | | |
|---|---|---|
| DE | 9313726 | 11/1993 |
| EP | 1035025 | 9/2000 |

* cited by examiner

PAPER TUBE PACKAGING WITH OPEN END AND COATED CAP

RELATED APPLICATIONS

This application claims priority and herein incorporates by reference U.S. provisional patent application Ser. No. 61/193,689, filed Dec. 16, 2008.

FIELD OF THE INVENTION

The field of the invention is containers, and more specifically biodegradable containers for dispensing a semi-solid composition.

BACKGROUND

Americans currently produce more waste than any other nation in the world. Much of the waste comes from plastic and/or metal, both of which decompose at a very slow rate. These materials must be recycled, dumped into the oceans or waterways, or deposited into landfills where they will remain for centuries. Unfortunately, plastic dispensing containers are used in almost every consumer market.

In order to reduce the waste in our ever-filling landfills, it is advantageous to create containers that are biodegradable and/or compostable. In an attempt to provide a more degradable container, the use of plastics such as polylactic acid polymers (PLA) have become more commonplace. However, such plastics still require specialized processes and facilities for degradation, which results in significant costs. In addition, PLA and similar plastics are visibly indistinguishable from normal plastics. This can be problematic because if the PLA is inadvertently placed within a group of traditional plastics to be recycled, the PLA can interfere with the entire recycling process.

There are paper based containers in the prior art, including for example the disposable dispensing container of US2007/0131713 to Hill. Unfortunately, Hill contemplates an inner plastic protective layer for presumably rendering the container impermeable to its contents. As such, Hill's container is far from being one hundred percent biodegradable. In addition, Hill's dispenser appears to be a one time use container.

Hill and all other extraneous materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

EP1035025 to Lowry teaches a container having a body and a cap that is made substantially out of paper, but like Hill uses some sort polymer or foil as a liner for rendering the container impermeable to its contents. The use of foils and polymers in Lowry impart biodegradability issues and still contribute to our landfill problems.

Instead of a plastic layer, it is also known to coat paper to render it impermeable to liquids. U.S. Pat. No. 7,344,784 to Hodson discusses fibrous sheets that can be impregnated or otherwise coated with polymers or blends to provide resistance to liquids. Hodson contemplates that the coated sheets can then be used to manufacture many articles including jugs and cups.

U.S. Pat. No. 7,048,975 to Tojo teaches a pulp molded container that utilizes a synthetic resin (like an acrylic resin) coating on the inner surface of the container for rendering it impermeable to its contents. Tojo makes a significant improvement over the previous paper containers by molding pulp fibers; but like Hill and Lowry, Tojo's synthetic resin imparts biodegradability issues. Still further, Tojo contemplates that a molded cap can be used with the container, but Tojo fails to contemplate the cap being coated.

U.S. Pat. No. 5,217,164 to Sullivan teaches a biodegradable dispenser that uses inner and outer sleeves of paper to house a product in stick form. Sullivan contemplates coating the inner surface of the concentric peel-off sections of the inner sleeve (which defines the product lumen) to render it impermeable to the product. However, Sullivan fails to contemplate coating other areas of the inner sleeve, or the cap portion of the outer sleeve. Thus, like Tojo, Sullivan fails to contemplate a paper container having a coated cap.

Thus, there is still a need for a biodegradable tube and mating cap having their interior surfaces coated to render them substantially impermeable to a semi-solid composition.

SUMMARY OF THE INVENTION

The inventive subject matter provides apparatus, systems and methods in which a biodegradable tube comprises a non-rigid paper tubular body defining a lumen; a paper tubular cap that mates with the body; and wherein interior surfaces of the each of the body and the cap have a coating that is substantially impermeable to a semi-solid composition.

As used herein the term "paper" means a fibrous material characterized by a plurality of discrete fibers. The filaments can be plant or animal derived, synthetic, or some combination of these. In "plant-derived fibrous materials" the filaments are at least predominantly of plant origin, examples of which include wood, papyrus, rice, ficus, mulberry, fibers, cotton, yucca, sisal, bowstring hemp and New Zealand flax. Further, as used herein the term "fibrous wall" means a wall comprising a fibrous material as a significant structural constituent. The fibrous walls contemplated herein preferably have at least 2, 5, 10, 20 or even 30 dry weight percent of fibers. Preferably, the fibrous walls have at least 80 or 90 dry weight percent of fibers. Paper is generally a fibrous material that is usually made by pressing and de-watering moist fibers, typically cellulose pulp derived from wood, rags, or grasses. In preferred embodiments, the paper materials of the tube body and the cap have substantially the same chemical composition.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used herein the term "semi-solid composition" means any compound having a viscosity of at least 50 to 200,000,000 Centipoise. Preferred semi-solid compositions are medium viscosity compositions having a viscosity of 2,000 to 2,000,000 Centipoise, but low viscosity compositions in the range of at least 50 to less than 2000 Centipoise, as well as high viscosity compositions in the range of more than 2,000,000, up to 100,000,000 Centipoise are contemplated. Contemplated semi-solid compositions include lip balm, lip stick, skin cream, shampoo, deodorant, toothpaste, shoe polish, stain stick remover, and grease sticks. Frozen goods such as ice cream are also contemplated.

As used herein the term "substantially impermeable coating" means a permeation barrier that has a transfer rate of less than or equal to 50 µl of water and/or sunflower oil per cm2 per six-month period of time at room temperature and normal atmospheric pressure (STP). It is contemplated that the coating could be applied to parts of the tube prior to assembly, or even after assembly. In preferred embodiments, the walls of the tube/cap comprise a rolled paper material upon which the coating has been coated on the interior and exterior surfaces of the walls. It is also contemplated that the coating can be: (1) on an exterior surface or interior surface of at least one of the tube body and the cap; (2) impregnated within the material forming the walls of the tube and cap; or (3) disposed between the layers of at least one of the tube body and cap. A permeation barrier exists for "substantially all regions of the lumen" means a permeation barrier exists somewhere on the inner surfaces of the body and cap, between the inner and outer surfaces of the body and cap, or on the outer surfaces of the body and cap for at least 95% of the surfaces defining the lumen. Thus, even if a non-barrier layer is buttressed by a barrier layer, this is still "substantially all regions of the lumen." As used herein, "lumen" means the inner space defined by the walls of the body or cap.

In a preferred embodiment, the coating comprises an adhesive, which can be any compound in a liquid or semi-liquid state used to adhere or bond items together, and which is formed from a biodegradable material. Prior to use, adhesives can be pastes (very thick) or glues (relatively fluid). All suitable adhesives are contemplated, including for example Elmer's™ Glue (polyvinyl acetate), or simply a glue made from water, milk powder, vinegar and baking soda (e.g. a biodegradable adhesive). It is also contemplated that the coating can comprise a sugar cane protein. Other suitable coating materials include those disclosed in U.S. Pat. No. 7,344,784 to Hodson or US20050130261 to Wils.

The walls of the body of the tube and the cap are preferably made of any suitable fibrous material, preferably biodegradable materials comprising paper, cardboard, or fiberboard. Wrapped materials seem to have the best strength and cost characteristics. In an exemplary embodiment, the tubular body and cap are made from wrapped 60 lb paper stock that is 100% post consumer waste. As used herein, a "biodegradable material" means a material that will break down to at least 90% $H_2O$, $CO_2$, and biomass within a period of six months from the action of naturally occurring micro-organisms such as bacteria, fungi, algae etc. under favorable conditions. For example, milk, baking soda, meat, plants, wood, cotton, polylactic acid polymers, fiber stone, and paper are all deemed herein to be biodegradable materials.

In preferred embodiments, the non-rigid tube body and the cap form a cylindrical shape having tapered sealed ends. It is also contemplated that the walls of the body and the cap could be shaped to have polygonal, oval or other horizontal cross-sectional shapes. In addition, the walls could even form a cone, or be frustoconical shaped. The wall of the body of the tube and cap could be any thickness, but is preferably no more than 0.5 mm thick. As used herein the term "tube" means any compressible or non-compressible container used for housing objects, solids, liquids, and semi-solids. As used herein a "narrow tube" is one in which the length of the tube is at least $3/\pi$ times the cross-sectional area of the open end of the body taken perpendicular to a long axis of the tube. The walls of the tube/cap typically include 1 to 5 layers (e.g. wraps), and most preferably 3 layers of the paper/coating combination. As used herein, the term "non-rigid" with respect to the body means that a user can realistically use his/her fingers to compress some portion of the walls of the body sufficiently to dispense the semi-solid.

The walls of the tube body and cap preferably have an open end and a sealed end. As used herein, the term "open end" means that the wall defines an opening that is ordinarily open during typical usage. Similarly, as used herein, the term "sealed end" means that the wall defines an end that is ordinarily closed during typical usage. Under these definitions, an ordinary shampoo bottle is a container having a wall with an open top because the cap is either removed or disposed in an open position during typical usage. Also under these definitions, a Campbell's soup can with a pull tab top has a wall with an open top because the top is removed during typical usage. The bottom of such a soup can, however, is closed because the bottom is not removed during typical usage.

In exemplary embodiments the sealed ends of the tube body the cap are tapered to form transverse seals that can be pinched, crimped, or folded, but any other suitable seal is contemplated. Advantageously, the end of the tube body is tapered allowing a user to easily compress the tapered end of the tube to dispense the semi-solid composition. As used herein, "transverse seals" mean any type of seal that runs perpendicular to the longitudinal axis of the tube. It is also contemplated that the sealed ends can be folded inwardly to form a rim surrounding a center disc, or even have cylindrical sealed ends.

The cap can mate with the tube body by a snap fitting, snug fit, screw threads, or any other suitable mating arrangement. As used herein the term "cap" means any object that fits over an edge of the open end of the tube, regardless of whether the open end of the tube is formed from an inner or outer sleeve of material.

In preferred embodiments, the open end of the cap is sized and dimensioned to slidably engage an exterior surface of the open end of the tubular body. Preferred caps have a longitudinal dimension that is less than a longitudinal dimension of the tube body; however it is contemplated that the cap could have a longitudinal dimension greater than the tube body—to accommodate the tube body being nested within the cap. In still other embodiments the cap can comprise an interior flat surface that pushes the semi-solid composition back into the tube body when the cap mates with the body, and also a sliding tapered insert could be disposed within the lumen of the tube body to aid in the dispensing of the semi-solid composition. It is also contemplated that a safety opening strip could securely hold the tube body and the cap together to prevent tampering.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
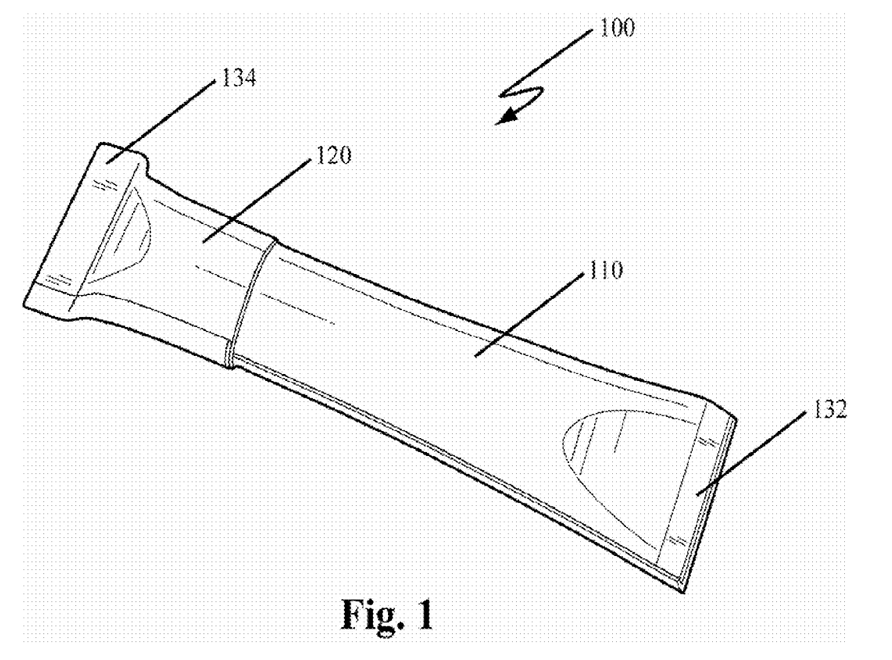
FIG. 1 is a perspective view of one embodiment of the biodegradable tube of the present invention, wherein the sealed ends of both the tube body and the cap have tapered crimped ends.

FIG. 1 generally depicts tube 100 of the present invention, comprising a tubular body 110 and a tubular cap 120 mated with body 110. As shown in FIG. 1, body 110 and cap 120 have tapered sealed ends 132 and 134, respectively.

Figure 2:
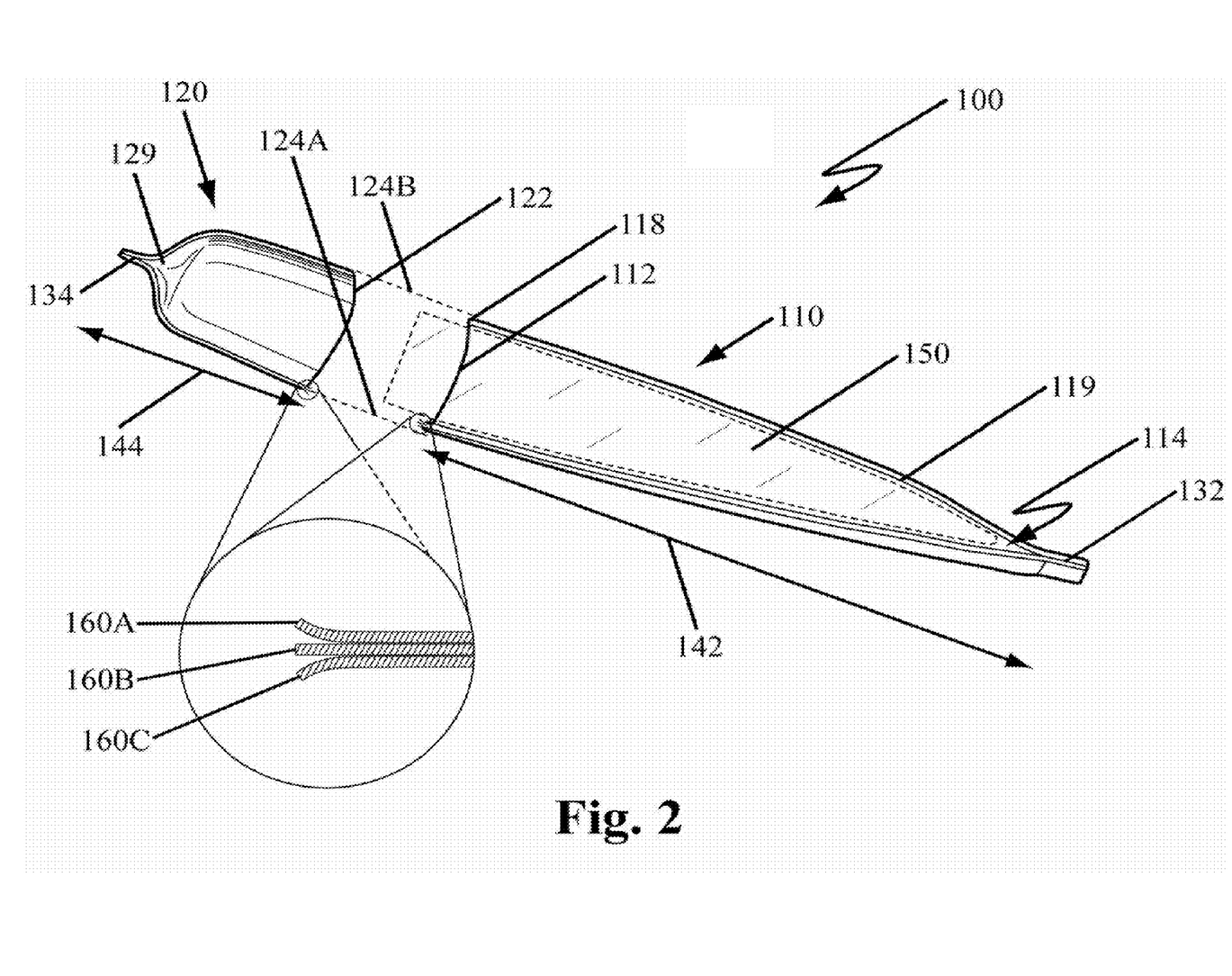
FIG. 2 is a cross sectional view of the tube of FIG. 1 illustrating the cap separated from the tube body. In addition, FIG. 2 includes a blow-up view of the layers of the cap and the tube body.

FIG. 2 is a cross sectional view of tube 100 of FIG. 1 having tubular body 110 and cap 120. As shown in FIG. 2, body 110 has an open end 112, a tapered sealed end 132, and a lumen 114 defined by the walls of body 110 containing a semi-solid composition 150. Cap 120 is depicted as having an open end 122 and a tapered sealed end 134, and a lumen defined by the walls of the cap 120. The open end 122 of cap 120 is sized and dimensioned to slidably engage an exterior surface 118 of the open end 112 of the body 110 (shown by dotted lines 124A and 124B). It is contemplated that an interior surface 119 of body 110 and an interior surface 129 of cap 120 have a substantially impermeable coating (not shown) to the semi-solid composition 150.

In a preferred embodiment, as shown in FIGS. 1 and 2, the walls of body 110 and cap 120 are non-rigid and form a cylindrical hollow tube having tapered sealed ends 132 and 134, respectively. It is contemplated that the body 110 and cap 120 could be shaped to have a polygonal, oval or other horizontal cross-sectional shapes suitable for a dispensing semi-solid composition 150. In addition, body 110 and cap 120 could even be cone or frustoconical shaped.

The walls of the body of the tube and cap could be any thickness, but are each preferably no more than 0.5 mm thick. In addition, the diameters of body 110 and cap 120 could have any suitable dimensions, but are preferably in a range of at least 0.5 cm to 3 cm, and more preferably 1 cm to 2 cm. Still further, in preferred embodiments the longitudinal dimension 142 of body 110 is greater than or equal to the longitudinal dimension 144 of cap 120. Also in preferred embodiments, the ratio is 3:1, but alternative ratios are possible, for example, 1:1, 1:1.5, 1:2, 1:4, 1:5, 1.6, or 1:10. It is further contemplated that the cap could have a longitudinal dimension greater than the tube body to accommodate the tube body being nested within the cap, and then another end piece (not shown) mates with the cap to seal the tube.

Preferred walls of body 110 and cap 120 are composed essentially of a structural material (preferably rolled 40-80 lb pound recycled paper) and a coating (i.e. permeation barrier material). Other structural materials could additionally or alternatively be used, including for example other types of biodegradable, fibrous materials. The structural material of body 110 and cap 120 could also be molded as opposed to being rolled. It is further contemplated that the structural material of body 110 and cap 120 could be formed out of a fibrous material (e.g., tissue paper, paperboard, wovens and non-wovens, plant leaves, kraft paper, specially treated wood veneer) or non-fibrous materials (e.g., poly lactic acid polymer, leather or cellophane). The structural material of both the body 110 and cap 120 can comprise substantially the same chemical composition or be made of different compositions. Alternatively, the tube body 110 and cap 120 could be molded as a single piece composed of fibrous material or vulcanized latex.

In a preferred embodiment, as shown in the blow-up view of FIG. 2, the walls of cap 120 and body 110 are non-rigid and have three layers of wrapped paper (160A, 160B, 160C) to allow sufficient compressibility of the wall material for dispensing the semi-solid material. Alternatively, there may only be 1 layer, or 2, 4, 5, 6, or more layers of wrapped fibrous material depending on the intended usage of the tube. It is also contemplated that the layers may comprise a combination of different fibrous or non-fibrous materials. Still further it is contemplated that only one sheet of material may be used having at least 1, 2, 3, 4, or N plies of material so that a single wrap can form the tube body and cap having the edges of the wall material bonded together to form a longitudinal seam. The longitudinal seam can have bonded overlapping edges or include longitudinal seam configurations such as those disclosed in US 2004/0052987 to Shetty. It is also contemplated that the walls of the body 110 and cap 120 could be rigid, such as walls being formed out of a wound paper core having a heavy thickness.

Preferred sealed ends 132 and 134, respectively of body 110 and cap 120 are transverse seals, however spirally formed seals, and other shaped seals are contemplated. As shown in FIGS. 1 and 2, body 110 and cap 120 preferably have transverse tapered sealed ends 132 and 134, respectively formed by pinching or crimping. Preferred open end 112 (i.e. dispensing end) of body 120 is an opening defined by a rim of the walls of the body, but it is also contemplated that open end 112 could comprise an additional or alternative dispensing end including for example, a nozzle such as those utilized in toothpaste tubes.

Figure 3A:
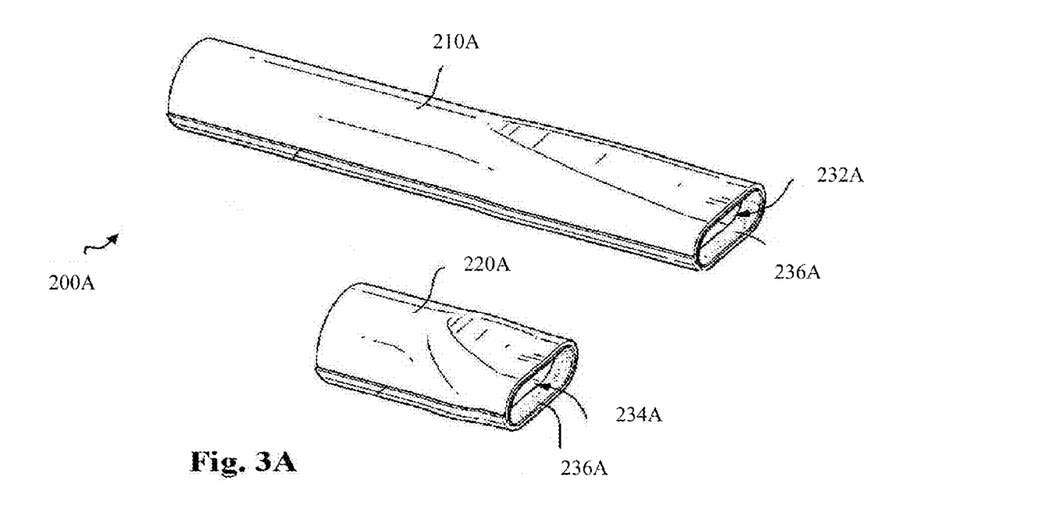
FIG. 3A is a perspective view of an alternative tube having sealed ends that define a rim.
Figure 3B:
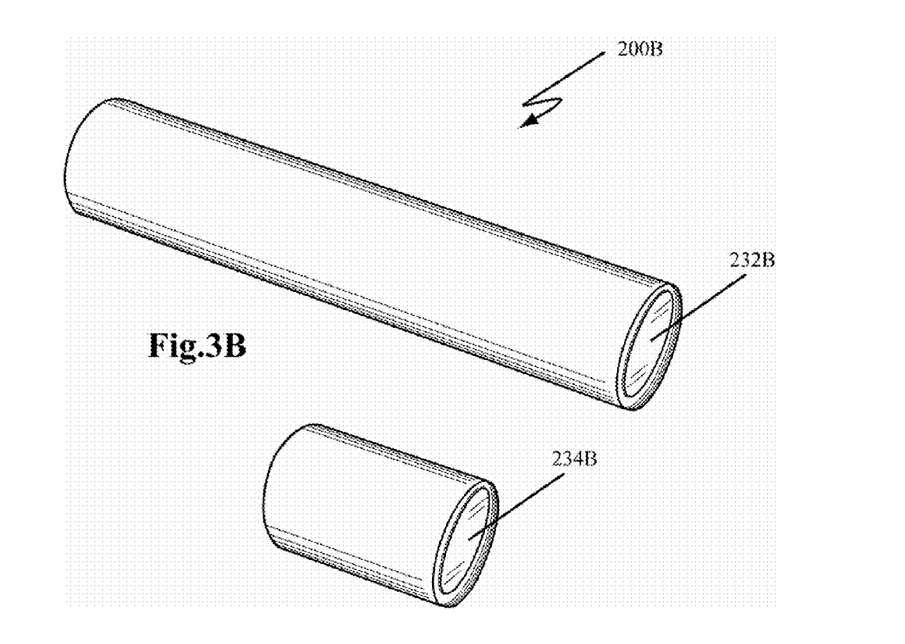
FIG. 3B is a perspective view of an alternative tube having cylindrical sealed ends.

FIG. 3A depicts an alternative tube 200A, in which body 210A and cap 220A have sealed ends 232A and 234A, respectively, in which that the walls of body 210A and cap 220A are folded inwardly to define a rim 236A surrounding a center portion (not shown) that can be a flat disc or other end closure member utilized to seal the ends of body 210A and cap 220A. Tube 200A could be, but is not necessarily, biodegradable. It is also contemplated that FIG. 3A depicts a tube as discussed in FIGS. 1-2 just prior to pinching or crimping to form a tapered sealed end as shown in FIGS. 1 and 2. FIG. 3B depicts another alternative tube 200B having cylindrical sealed ends 232B and 234B. It is contemplated that cylindrical sealed ends 232B and 234B could be formed by insertion of a disc, mating an end cap or other rounded end closure member, and then sealing the ends by any suitable method.

Figure 4:
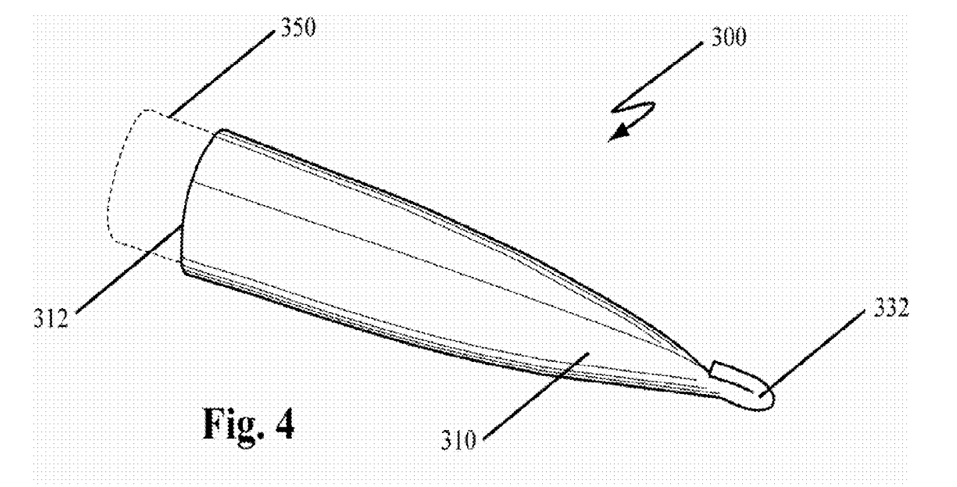
FIG. 4 is a perspective view of another alternative tube having a folded end with the semi-solid composition protruding from the open end of the tube.

FIG. 4 depicts yet another alternative tube 300 (without the cap) having a folded sealed end 332, such that the semi-solid composition 350 protrudes from an open end 312 of the body 310. Many other sealing methods are further contemplated, including for example, hot glue.

Preferred coating (i.e. permeation barrier) is an adhesive or glue that is biodegradable and is composed of milk protein that is formed by mixing water, milk powder and vinegar to create a crud, separating the vinegar from crud, and then adding water and baking soda to the crud to form a milk protein glue. It is also contemplated that the coating may comprise a sugar cane protein. In addition, the coating can be composed of alternative FDA approved food-grade adhesives, glazes and other biodegradable materials such as an inner liner composed of beta-hydroxybutryic acid polymer or other suitable coating materials including those disclosed in U.S. Pat. No. 7,344,784 to Hodson or US20050130261 to Wils.

The coating can be used solely for rendering the walls of the body and cap substantially impermeable to the semi-solid composition, or may perform the function as an adhesive for holding the wall layers together, or to perform both functions. In addition, the sealed ends 132 and 134 of the body 110 and cap 120 can be sealed using the coating, or other suitable biodegradable glues, including for example mucilage.

Preferred surface coatings are thin films, perhaps 0.0001 mm to 1 mm thick. In preferred embodiments, the coating is on both sides of the papers that comprise the tube body 110 and the cap 120. In alternative embodiments, the coating could be: (1) limited to the interior surfaces of the body and cap; (2) limited to the exterior surface of at least one of the body and cap; (3) disposed between layers of at least one of the body and cap; or (4) impregnated within at least one of the layers of the body and cap. The coating can be applied via spraying, rolling, or other techniques that are known in the art, including for example lamination. In addition, the coating can be applied before, during, or after formation of the tube. It is still further contemplated that the coating exists for "substantially all regions of the lumen" meaning the coating exists somewhere on the inner surfaces of the body and cap, between the inner and outer surfaces of the body and cap, or on the outer surfaces of the body and cap for at least 95% of the surfaces defining the lumen.

In still other alternative embodiments, the structural wall material of the body 110 and cap 120 can be formed by wrapping materials that are inherently impermeable to the semi-solid composition without the need of the coating, including for example, vulcanized latex sheets. In addition, it is contemplated that some uses of the tube will not require a coating, or that different uses will require different amounts or kinds of coatings.

Contemplated semi-solid product materials 150 include, but are not limited to: (1) lip balm, facial cream, lotion, deodorant, hair colorant, foundation stick, eye liner, foot cream, wrinkle cream, analgesic stick, semi-solid hand sanitizer, sunscreen, bronzer, fingernail polish, and other health and beauty products; (2) ice cream, yogurt, marzipan, soft chocolate, peanut butter, soft cheese, ketchup, mustard, mayonnaise, relish, seasonings, and other edible or consumable products; (3) putty, caulk, silicones, sealants, wood filler, glue stick, metal and plastic filler, rubbing compound, grease stick and other lubricants, mosquito and other repellants, fire starters, stain removers, boat leak paste, rosin, shoe and other polishes, and other home repair and maintenance products. Typically, semi-solid or other product material 150 are either water or oil based, and could be a combination of both. As used herein, "oil" means any hydrophobic material that is liquid at room temperature. This includes, for example, petroleum, vegetable oil, butter, peanut butter, grease, and liquid animal fat. Liquids or solids could also be used in tube as a product material, for example candy, cigarettes, spices, powdered drinks, protein powder, pins, tacks, screws, nails, jewelry, and pharmaceuticals. The list above is by no means meant to be exhaustive, as many additional semi-solid, frozen or dry compositions are contemplated.

Figure 5:
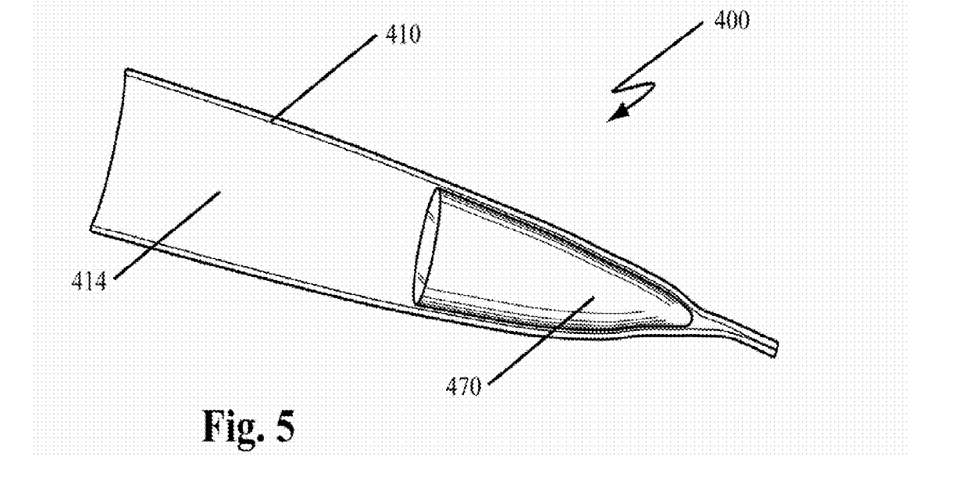
FIG. 5 is a cross sectional view of the tube body of FIG. 1 showing a tapered insert disposed in the lumen of the tube.

FIG. 5 shows another alternative tube 400 (used with a cap but here depicted without the cap) having a sliding tapered insert 470 disposed in the lumen 414 of the body 410. The sliding tapered insert aids in dispensing the semi-solid composition out of the body of the tube. The tapered insert can be made of any suitable materials, including for example wood or other biodegradable materials. As shown, the tapered insert is cone shaped, but it is contemplated that the insert could be any other suitable shape. Obviously, the insert 470 would preferably be sized to slide snugly within the lumen. It is also contemplated that tube 400 can include any other suitable biodegradable pusher, including for example those used in conventional lip balm tubes for dispensing the semi-solid composition, and which is made out of biodegradable materials. It is also contemplated that cylindrical sealed end 232B of tube 200B can be pushed upwardly to act as a pusher for dispensing the semi-solid composition.

Figure 6:
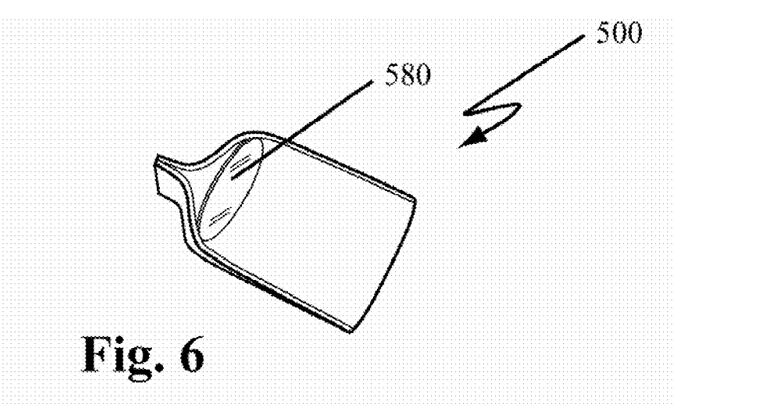
FIG. 6 is a cross sectional view of the cap of FIG. 1 showing the flat inner cap push back feature.

FIG. 6 shows an alternative cap 500 that has an interior flat surface 580 for pushing the semi-solid composition back into the body of the tube (not shown) when the cap 500 mates with the body of the tube. It is also contemplated that the surface 580 could be cone shaped or have any other suitable shape for maintaining the shape of the end of the semi-solid composition (e.g. lip stick).

Figure 7:
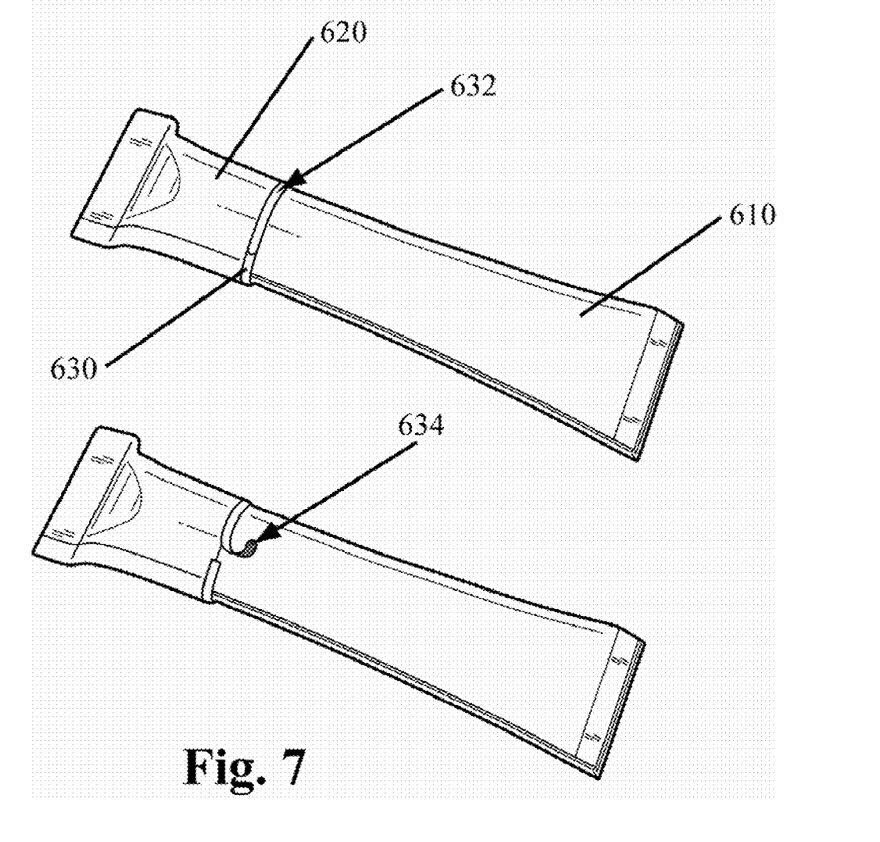
FIG. 7 depicts a safety opening strip that securely fastens the tube body to the cap.

FIG. 7 depicts a safety opening strip 630 that is used to seal the cap 620 and the body 610 to prevent tampering. Opening strip 630 can be any suitable biodegradable material that allows a user to peel back the strip to open the tube for use. FIG. 7 depicts a sealed configuration 632 of strip 630, and also a slightly unpeeled position 634 of the strip 630. Alternatively, a string could be embedded near the cap edge that has been glued to the tube body with a small section protruding that could be pulled in a manner that would tear a portion of the cap near the edge to allow separation of the cap from the tube body.

Figure 8:
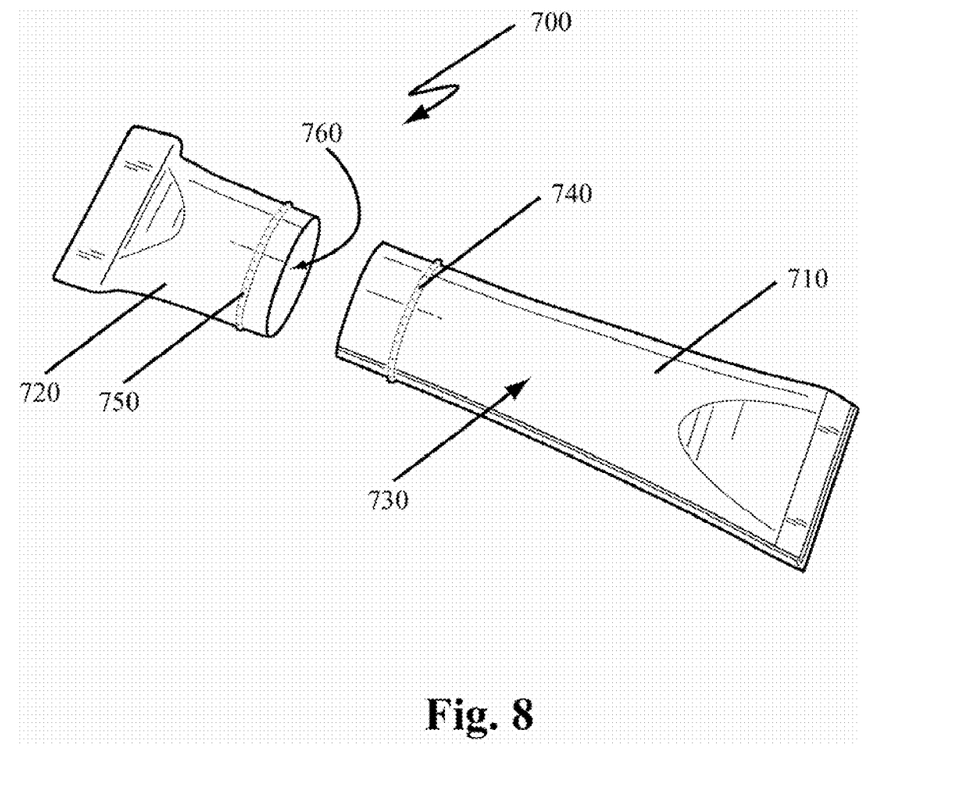
FIG. 8 depicts a raised snap ring on an external surface of the tube body that mates with a corresponding depression on an interior surface of the cap for forming a snap fitting.

Preferred body 110 and cap 120 slidably mate to form a snug fitting as shown in FIG. 1. It is also contemplated than an external surface near open end 112 of the body 110 may include a rough or abrasive coating help keep the cap 110 mated to the body 120. FIG. 8 depicts yet another alternative tube 700 having a raised snap ring 740 on an external surface 730 of tube body 710, which mates with a corresponding depression 750 on an interior surface 760 of cap 720 for forming a snap closure. It is also contemplated that the body 110 and cap 120 may mate together via threads, but all other suitable couplings are contemplated, including for example materials that confer chemical or static electric affinity.

Figure 9A:
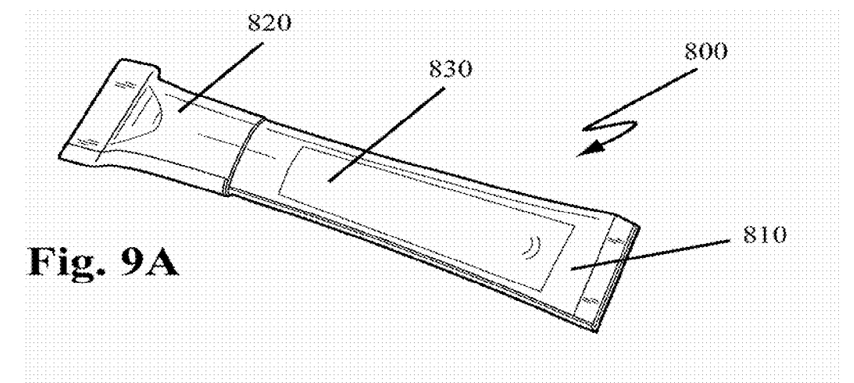
FIG. 9A depicts yet another alternative tube having a window.
Figure 9B:
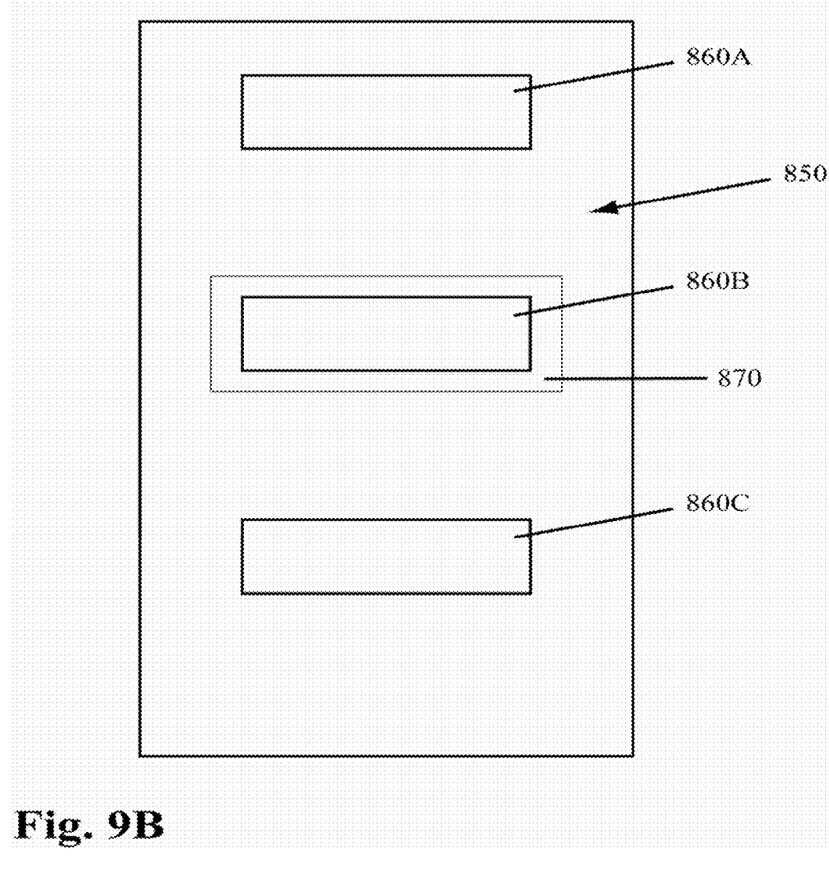
FIG. 9B depicts a sheet of paper material having a view window.

FIG. 9A depicts still another alternative tube 800 having body 810, cap 820, and a window 830 for viewing the contents of the tube. Preferred window can be made from cellophane or any other clear cellulosic/biodegradable material, including for example glassine. FIG. 9B depicts a sheet of paper material 850 having cut out voids 860A, 860B and 860C, wherein void 860B is depicted as having a rectangle cellophane window 870 larger than the window voids in both dimensions that is glued to paper 850, then the tube is glued and rolled to its finished shape 800 as depicted in FIG. 9A.

An exemplary method for making the biodegradable tube starts with one hundred percent post consumer waste paper, or other fibrous material. Preferred paper has the dimensions of 13 cm by 7.5 cm. As discussed above, a number of different types of biodegradable glues/adhesives are suitable for use in making the body and the cap. All appropriate printing is applied to the paper, prior to spinning. The ink used for the printing is a soy ink and is biodegradable. Next, the biodegradable glue is applied to the paper, and then spun about a mandrel. During the spinning process, a hollow mandrel that has been coated with palm oil is used. As the paper for the body is spun on the mandrel, a seam is formed and glued. The seam runs longitudinally the length of the body of the tube. The body is made with preferably an external diameter of about 1 cm to 2 cm.

After spinning, the body is slid to a point on the mandrel that is roughly 2.5 cm from disengagement so the sealed end can be formed. Glue or adhesive is applied to the end. The end is then pinched to form a closure. This crimping is done by applying mechanical pressure, which could imparted with a simple clamp, approximately 0.3 cm from the exposed end, until the end seals. Subsequently, the body is removed, and the glue or adhesive is allowed to dry. The cap can be made in a similar manner, but is shorter and has a slightly larger diameter than the body to facilitate mating with an external surface of the body.

After drying, the body is filled with a semi-solid composition thru the open end of the body, and then the cap is placed on the body. The biodegradable tube can be simply operated by a consumer by removing the cap and pinching the end of the body to dispense the semi-solid composition. When the semi-solid composition is depleted, the entire tube with the cap can be placed in the consumer's compost pile, or recycled with other paper goods.

The above process is exemplary. Any form of tubular body and cap can be used to enclose the semi-solid composition, as long as the body and cap are made from biodegradable materials, which can be joined by a biodegradable glues or adhesives.

Figure 10:
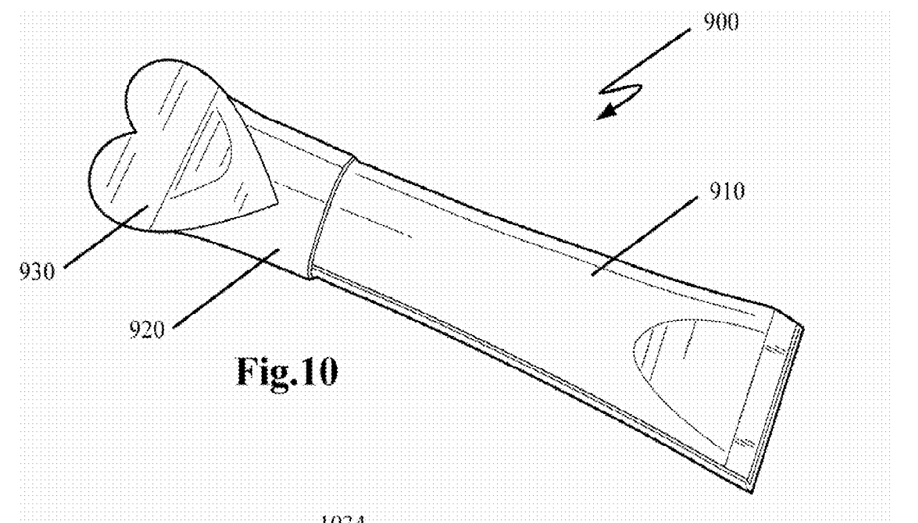
FIG. 10 is a perspective view of another alternative tube having a heart shaped cap
Figure 11:
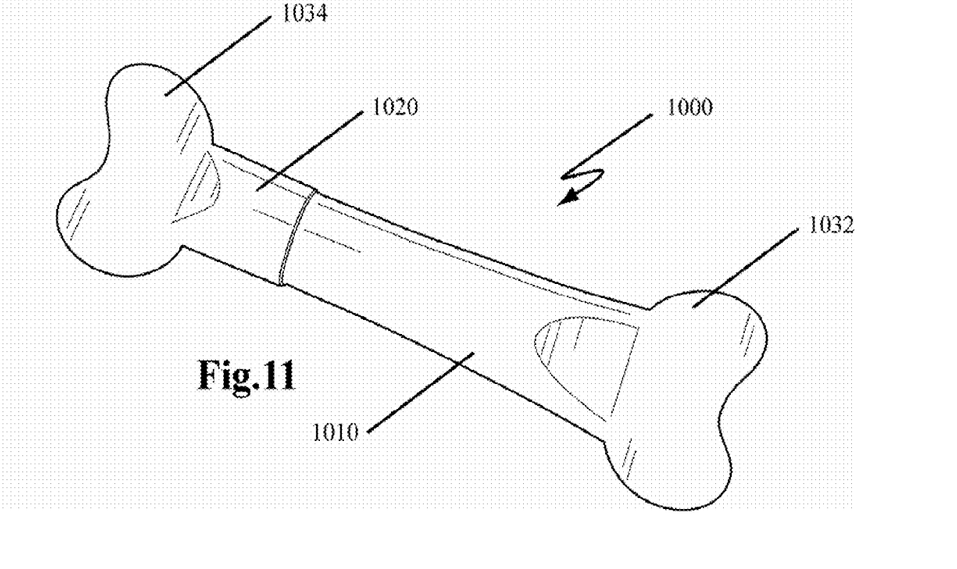
FIG. 11 is a perspective view of another alternative tube having bone shaped ends.
Figure 12:
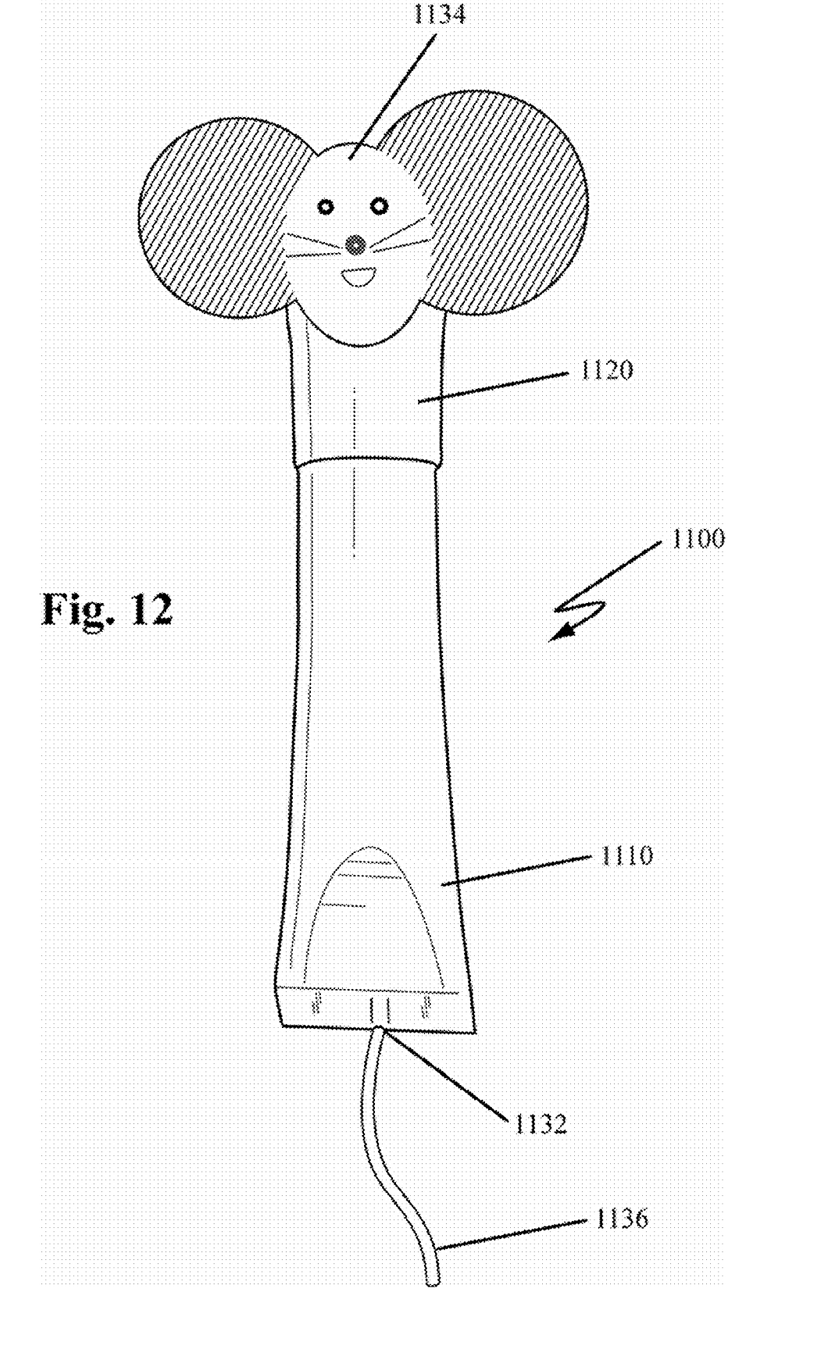
FIG. 12 is a perspective view of yet another alternative tube having a cartoon character shaped cap with a tail extending from the end of the tube body.

FIG. 10 depicts yet another alternative tube 900 with cap 920 having a heart shaped end 930. It is contemplated that the heart shaped end 930 could be formed by a press or die, or any other suitable method for creating the desired shape. Tube 900 could even include decorative elements (not shown) bonded to cap 920 and body 910. FIG. 11 depicts tube 1000 with body 1010 and cap 1020 having ends 1032 and 1034, respectively resembling the ends of a bone. Ends 1032 and 1034 can be formed into any other suitable shape, including for example a star, a leaf, or any other object, or even an extended tab having a phrase or inscription. FIG. 12 depicts still another tube 1100 with cap 1120 formed into the head of a cartoon character 1134, and end 1132 of body 1110 having a tail 1136 extending therefrom. It is also contemplated that cap 1120 could resemble a tiger head, a famous political figure or artist, or any other animal or humanlike figure.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps can be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc. Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

What is claimed is:

1. A tube comprising:
   a non-rigid tubular body having first, second, and third plies of a first rolled paper, the body defining an open end, a sealed end, and a lumen containing a semi-solid composition;
   a tubular cap having first, second, and third plies of a second rolled paper, the cap having an open end and a sealed end, wherein the open end of the cap mates with the open end of the body; and
   further comprising a biodegradable coating that is substantially impermeable to the semi-solid composition, and disposed between the first, second, and third plies of the body and the first, second, and third of the cap.

2. The tube of claim 1 wherein the semi-solid composition comprises one of a lip balm, a lip stick, and a skin cream.

3. The tube of claim 1 wherein the semi-solid composition comprises one of a shampoo, a deodorant, and a toothpaste.

4. The tube of claim 1 wherein the semi-solid composition comprises one of a shoe polish, a stain stick remover, and a grease stick.

5. The tube of claim 1, wherein the tubular body has a wall thickness of no more than 0.5 mm.

6. The tube of claim 1, wherein the second paper has substantially the same chemical composition as the first paper.

7. The tube of claim 1, wherein each of the sealed ends of the body and cap are transverse seals.

8. The tube of claim 7, wherein the transverse seals are formed by at least one of crimping and folding.

9. The tube of claim 1, wherein the open end of the cap is sized and dimensioned to slidably engage an exterior surface of the open end of the body.

10. The tube of claim 1, wherein the cap has a longitudinal dimension that has a ratio of at least 1:6 with respect to a longitudinal dimension of the body.

11. The tube of claim 1, further comprising a sliding tapered insert disposed in the lumen.

12. The tube of claim 1, wherein the tubular cap further comprises an interior flat surface that pushes the semi-solid composition back into the tubular body when the cap mates with the body.

13. The tube of claim 1, wherein the coating comprises a milk protein.

14. The tube of claim 1, wherein the coating comprises a sugar cane protein.

15. The tube of claim 1, further comprising an opening strip.

16. The tube of claim 1, wherein the coating is an adhesive.

17. The tube of claim 1, wherein the coating is on an outside surface of at least one of the body and the cap.

18. The tube of claim 1, wherein the coating is disposed between layers of at least one of the body and the cap.

19. The tube of claim 1, wherein the coating is impregnated within at least one of the first and second papers.

20. The tube of claim 9, wherein the exterior surface of the body includes a raised ring that mates with a corresponding depression on the interior surface of the cap.

* * * * *